(12) United States Patent
Lutz et al.

(10) Patent No.: US 10,619,582 B2
(45) Date of Patent: Apr. 14, 2020

(54) METHOD FOR ESTIMATING THE FLOW RATE OF RECIRCULATED EXHAUST GAS PASSING THROUGH A VALVE

(71) Applicant: CONTINENTAL AUTOMOTIVE FRANCE S.A.S., Toulouse (FR)

(72) Inventors: Philippe Lutz, Le Vesinet (FR); Florent David, Suresnes (FR); Kévin Surbled, Suresnes (FR)

(73) Assignee: CONTINENTAL AUTOMOTIVE FRANCE S.A.S., Toulouse (FR)

( * ) Notice: Subject to any disclaimer, the term of this patent is extended or adjusted under 35 U.S.C. 154(b) by 43 days.

(21) Appl. No.: 15/769,839

(22) PCT Filed: Oct. 21, 2016

(86) PCT No.: PCT/FR2016/052729
§ 371 (c)(1),
(2) Date: Apr. 20, 2018

(87) PCT Pub. No.: WO2017/068297
PCT Pub. Date: Apr. 27, 2017

(65) Prior Publication Data
US 2018/0306133 A1    Oct. 25, 2018

(30) Foreign Application Priority Data

Oct. 23, 2015  (FR) .................................... 15 60115

(51) Int. Cl.
| F02D 41/00 | (2006.01) |
| F02M 26/06 | (2016.01) |
| F02M 26/47 | (2016.01) |

(52) U.S. Cl.
CPC ..... *F02D 41/0072* (2013.01); *F02D 41/0065* (2013.01); *F02M 26/06* (2016.02);
(Continued)

(58) Field of Classification Search
CPC ............. F02D 41/0065; F02D 41/0072; F02D 2041/0067; F02M 26/06; F02M 26/47
See application file for complete search history.

(56) References Cited

U.S. PATENT DOCUMENTS

| 5,964,820 A | 10/1999 | Miwa et al. |
| 6,347,519 B1 | 2/2002 | Kreso |

(Continued)

FOREIGN PATENT DOCUMENTS

| EP | 2 853 723 A1 | 4/2015 |
| FR | 3 011 073 A1 | 3/2015 |

(Continued)

OTHER PUBLICATIONS

International Search Report, dated Feb. 14, 2017, from corresponding PCT application No. PCT/FR2016/052729.

*Primary Examiner* — Audrey K Bradley
(74) *Attorney, Agent, or Firm* — Young & Thompson

(57) ABSTRACT

Disclosed is a method for estimating the flow rate $Q_{EGR}$ of exhaust gases recirculated through an exhaust gas recirculation valve connecting an exhaust circuit and an intake circuit of a combustion engine, the method including the steps: —of determining a difference in pressure $\Delta P$ between the upstream and downstream sides of the valve, determining a density $\rho_{EGR}$ of the recirculated exhaust gases passing through the valve, determining a corrected effective area $S_{eff\_cor}$ of the valve, estimating the flow rate QEGR of the recirculated exhaust gases from these three parameters.

15 Claims, 2 Drawing Sheets

(52) U.S. Cl.
 CPC ..... *F02M 26/47* (2016.02); *F02D 2041/0067* (2013.01); *F02D 2200/0402* (2013.01); *Y02T 10/47* (2013.01)

(56) References Cited

U.S. PATENT DOCUMENTS

| | | |
|---|---|---|
| 6,588,210 B2 | 7/2003 | Kreso |
| 2007/0119172 A1 | 5/2007 | Barbe et al. |
| 2008/0022677 A1 | 1/2008 | Barbe et al. |
| 2011/0120428 A1 | 5/2011 | Pasero et al. |
| 2012/0109494 A1* | 5/2012 | Jeschke ............... F02D 41/0072 701/102 |
| 2012/0312001 A1 | 12/2012 | Nam |

FOREIGN PATENT DOCUMENTS

| | | |
|---|---|---|
| GB | 2 319 361 A | 5/1998 |
| GB | 2 475 316 A | 5/2011 |
| WO | 01/75287 A1 | 10/2001 |
| WO | 2012/038639 A1 | 3/2012 |

\* cited by examiner

METHOD FOR ESTIMATING THE FLOW RATE OF RECIRCULATED EXHAUST GAS PASSING THROUGH A VALVE

The present invention relates to a method for estimating the flow of exhaust gas recirculated through a recirculation valve, for a heat engine, especially for a motor vehicle.

BACKGROUND OF THE INVENTION

The principle of recirculating a portion of the exhaust gas of an internal combustion engine, for example in a motor vehicle, is known. Mixing exhaust gases with fresh intake air changes the course of combustion of the fuel mixture. Thus, the presence of exhaust gases, which are chemically inert, and have a high heat capacity, reduces the temperature of the exhaust gas. For a spark ignition engine, the self-ignition tendency of the mixture is also reduced, which decreases the engine's knocking tendency. In addition, recirculation of exhaust gases makes it possible to reduce losses from pumping. Thus, the use of exhaust gas recirculation makes it possible to reduce specific fuel consumption, which makes it a very interesting technology. To optimize the operation of the engine, the flow of recirculated gas must be continuously adapted to operating conditions. The flow is controlled by a recirculation valve, which has a variable opening. In order to control the flow of recirculated gas precisely, it is necessary to be able to estimate this flow precisely.

For example, from patent application FR3011073, we know a method for estimating the recirculated gas flow rate based on the flow equation of compressible fluids.

This equation requires knowing the absolute upstream and downstream pressure of the recirculation valve, as well as the temperature of the recirculated gases. There is therefore a need to have two separate pressure sensors, as well as a temperature sensor. This solution is therefore relatively expensive, and the integration of three sensors near the valve can be tricky.

In addition, when the upstream and downstream pressures of the valve are close, the flow curve has a very steep slope, and therefore offers low accuracy. These conditions are encountered in particular when the torque delivered by the engine is low. Indeed, the counterpressure in the exhaust circuit is low under these conditions. Therefore, the upstream pressure of the valve is close to atmospheric pressure, and the downstream pressure of the valve is as well.

SUMMARY OF THE INVENTION

The objective of the invention of the present application is to reduce the cost of the exhaust gas recirculation system and to improve the accuracy of calculation of recirculated gas flow.

For this purpose, the invention proposes a method of estimating an exhaust gas flow $Q_{EGR}$ recirculated through a recirculation valve connecting an exhaust circuit and an intake circuit of a heat engine, this method including the following steps:
  Determining a pressure difference $\Delta P$ between upstream and downstream from the valve, (step 50)
  Determining a density $\rho_{EGR}$ of the recirculated exhaust gas passing through the valve (step 53)
  Determining an effective corrected surface $S_{eff\_cor}$ of the valve, (step 57)
  Estimating the recirculated exhaust gas flow $Q_{EGR}$ from these three parameters. (step 58)

The determination of the recirculated gas flow rate only requires knowing the difference between the pressure upstream and the pressure downstream of the valve. It is not necessary to know the absolute pressure upstream and downstream of the valve. It is therefore not necessary to have two separate sensors.

In a preferred embodiment, the recirculated exhaust gas flow rate $Q_{EGR}$ is proportional to the square root of the pressure difference, the corrected valve effective cross-section and the square root of the density, according to the equation:

$$Q_{EGR} = S_{eff\_cor}\sqrt{2 \cdot \rho_{EGR} \cdot \Delta P}$$

This fundamental equation of the mechanics of incompressible fluids makes it possible to simply calculate the flow of recirculated exhaust gas.

Preferably, the pressure difference $\Delta P$ is determined by a sensor arranged to measure the difference between the pressure upstream and the pressure downstream of the recirculation valve.

A differential pressure sensor directly measures the pressure difference between the upstream side and the downstream side of the recirculation valve.

Alternatively, the pressure difference $\Delta P$ is determined by a sensor measuring the absolute pressure upstream of the valve and by an estimate of the pressure downstream of the valve. Rather than having a differential pressure sensor directly measuring the pressure difference between the upstream side and the downstream side of the recirculation valve, it is also possible to use a sensor that is only measuring the absolute pressure upstream of the valve. The absolute pressure downstream of the valve is determined from the atmospheric pressure, the latter being determined elsewhere. By subtracting the value of the pressure downstream of the valve from the pressure value measured upstream from the valve, the pressure difference is obtained on either side of the valve. It is thus possible to use a less sophisticated and less expensive sensor.

Advantageously, the method is made up of the following steps:
  Determining a pressure P downstream from the valve, (step 51)
  Determining a temperature $T_{egr}$ representative of the temperature of the gases flowing in the valve, (step 52)
  Determining the density $\rho_{EGR}$ of the gases passing through the valve from these two parameters. (step 53)

The density of the gases passing through the valve is calculated in real time in order to obtain the value of the flow rate precisely.

Advantageously, the temperature $T_{egr}$ is determined by a sensor measuring the temperature of the gases passing through the recirculation circuit 4.

According to one embodiment, the pressure P downstream from the valve is determined from a value of an estimated atmospheric pressure.

The pressure downstream from the valve is determined by subtracting from the value of the atmospheric pressure, the value of the pressure drop of the circuit portion between the air circuit inlet and the point where the recirculation circuit is connected to the air circuit. Atmospheric pressure is estimated elsewhere. Thus, it is not necessary to have an absolute pressure sensor downstream from the valve. This limits the cost.

Preferably, the density $\rho_{EGR}$ is proportional to the pressure P downstream from the valve and inversely proportional to the estimated temperature $T_{egr}$ according to the equation:

$$\rho_{EGR} = \rho_0 * \frac{T_0}{T_{egr}} * \frac{P}{P_0},$$

where $P_0$ and $T_0$ are the pressure and temperature conditions of the gases, and $\rho_0$ the density of the gases under normal conditions of pressure and temperature. The temperature is expressed in Kelvin.

The density of the recirculated exhaust gas is modeled using the ideal gas equation. This equation is valid given the level of pressure and temperature of the gases.

According to a preferred embodiment, the method includes the steps to:
   Measure a position of a movable shutter of the valve, the movable shutter being arranged to control the flow of gas passing through the valve by displacement between a minimum flow position and a maximum flow position, (step 54)
   Determine the effective area $S_{eff}$ of the valve from the measured position of the shutter. (step 55)

The effective surface of the valve is determined from the position of its movable shutter.

According to one embodiment, the movable shutter of the valve is a rotary flap and the measured position of the movable shutter is an angular position.

A rotary shutter valve has little pressure loss, which is favorable for obtaining a high flow rate. An angular position sensor makes it possible to know the position of the shutter and from there the effective surface of the valve.

According to yet another embodiment, the movable shutter of the valve is a rotary plug and the measured position of the movable shutter is an angular position.

This type of valve has a low level of leakage. As before, an angular position sensor makes it possible to determine the position of the rotary plug and consequently the effective surface of the valve.

According to yet another embodiment, the movable shutter of the valve is a valve that is mobile in translation and the measured position of the movable shutter is a linear position.

This type of mechanism is well adapted to high temperatures and pressures that may be encountered in certain applications, such as those where the valve is mounted upstream from the turbine of a centrifugal forced induction device. Since the movement of the shutter is linear, a linear position sensor is used to measure the position of the valve. The effective surface of the valve is determined from this information.

Preferably, the method involves the steps to:
   Determine a correction factor $F_c$ of the effective surface $S_{eff}$ of the valve, the correction factor depending on the difference between the pressures measured upstream and downstream from the valve, (step 56)
   Determine the effective corrected surface $S_{eff\_cor}$ of the valve, according to the relation: $S_{eff\_cor}=S_{eff}*Fc$. (step 57)

The effective surface is only a geometric factor characterizing the opening of the valve, but not taking into account the type of flow. Because of the turbulence and acoustic effects that may occur under certain operating conditions, a corrective factor is included in the flow calculation.

According to one embodiment, the corrective factor depends on the position of the movable shutter.

When the opening of the valve is small, the movable shutter creates an obstacle and disturbs the flow. The accuracy of the flow modeling is improved by introducing a correction factor to the effective surface of the valve.

The invention also applies to a device for estimating the flow of exhaust gas recirculated through a recirculation valve connecting an exhaust circuit and an intake circuit of a heat engine, the estimation device made of a data processing unit, set to:
   Determine a difference $\Delta P$ between the pressure upstream and the pressure downstream from the valve,
   Determine a density $\rho_{EGR}$ of the recirculated exhaust gas passing through the valve,
   Determine a corrected effective area $S_{eff\_cor}$ of the valve,
   Estimate the recirculated exhaust gas flow $Q_{EGR}$ from these three parameters.

The recirculated exhaust gas flow rate $Q_{EGR}$ is proportional to the square root of the pressure difference, to the effective section of the valve and to the square root of the density, according to the equation:

$$Q_{EGR} = S_{eff\_cor}\sqrt{2 \cdot \rho_{EGR} \cdot \Delta P}$$

The invention also relates to an exhaust gas recirculation system, made up of:
   a device for estimating the flow of recirculated exhaust gas as described above,
   an intake circuit arranged to supply combustion gases to a heat engine,
   a recirculation valve arranged to recirculate exhaust gas from the engine to the intake circuit.

For this purpose, the device for estimating the flow of recirculated exhaust gas is an electronic control unit arranged to control the opening of the recirculation valve in order to control the flow of recirculated exhaust gas.

The device for estimating the recirculated exhaust gas flow acquires the signals of the various necessary sensors and controls the opening of the recirculation valve.

Preferably, the intake circuit is arranged so that the pressure downstream from the recirculation valve is substantially equal to the value of the atmospheric pressure minus the pressure drop of the intake circuit portion located upstream to the recirculation valve. This happens when a metering valve, placed upstream from the point where the recirculation circuit joins the intake circuit, is nearly fully opened. Thus, the pressure loss created by the metering valve is low and it is possible to equate the pressure downstream from the recirculation valve to the atmospheric pressure minus the drop in pressure in the portion of the intake circuit that is upstream of the recirculation valve.

According to one embodiment of the invention, the intake circuit lacks an airflow regulator in a portion of the circuit that is located upstream from the exhaust gas recirculation point. When the flow of recirculated gas is sufficient without creating a vacuum downstream from the valve, the flow control device located upstream from the recirculation point of the gas is not necessary. The cost of this device is thus avoided.

According to one embodiment, the recirculation system is made up of a compressor for forced induction that is arranged to increase the pressure of the combustion gas flowing in the intake circuit, the exhaust gas being recirculated upstream from the compressor. This configuration, commonly known as "low pressure", is favorable for obtaining a high flow rate since the pressure differential across the recirculation valve is always favorable.

Preferably, the recirculation system is made up of a heat exchanger arranged to cool the recirculated exhaust gas before passing through the recirculation valve. The beneficial effect of recirculated exhaust gases on the combustion process is greater when the recirculated gases are cooled.

According to one embodiment, the recirculation system is made up of a backpressure valve arranged to increase the gases' pressure upstream from the recirculation valve. This solution makes it possible to increase the flow of recirculated gas and is an alternative to the upstream intake circuit valve of the recirculation point, previously mentioned.

Preferably, the backpressure valve is placed downstream from an exhaust gas depollution device.

The point where the recirculated exhaust gas enters the recirculation circuit is also placed downstream from the exhaust gas depollution device.

The recirculated gases are thus free of most of the solid and gaseous pollutants from the exhaust gas, which in particular reduces the clogging of the recirculation circuit.

BRIEF DESCRIPTION OF THE DRAWINGS

The invention will be better understood by looking at the figures.

DETAILED DESCRIPTION OF THE PREFERRED EMBODIMENTS

Figure 1:
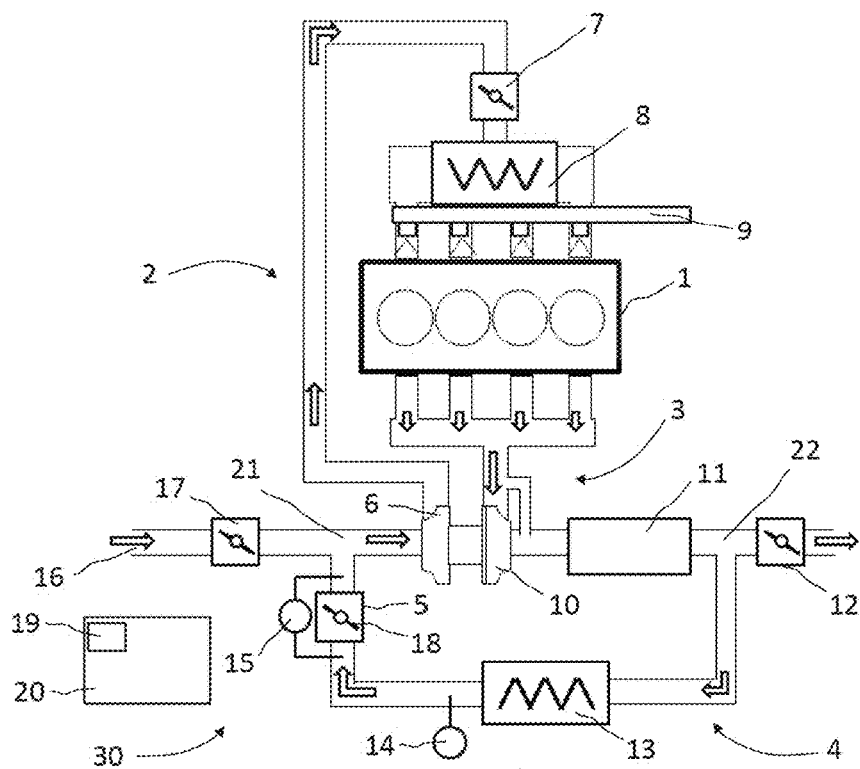
FIG. 1 represents, schematically, a combustion engine equipped with a recirculation system according to an exemplary embodiment.

FIG. 1 shows a combustion engine 1 equipped with its various components.

Engine 1 includes an intake circuit 2 of combustion gas, an exhaust circuit 3 of burnt gases and a recirculation circuit 4 of the exhaust gas.

The combustion air supplying engine 1 is admitted through inlet 16 of the intake circuit 2, and is then compressed by a forced induction device, including a compressor 6 driven by a turbine 10 secured to the same axis as the compressor 6. The flow of gas leaving the compressor 6 is cooled in the heat exchanger 8. The flow rate of this flow is adjusted by a metering valve, called a throttle body 7, and supplies the engine 1 with combustion gas. The intake distributor distributes the flow through the throttle body 7 between the different cylinders of the engine 1.

The fuel is injected into the engine 1 by an injection system 9 and burned in the combustion chambers, thus allowing the engine 1 to supply mechanical energy.

Engine 1 is a spark ignition type engine.

A control unit 20 controls the various actuators of the engine 1, from the information received from the various sensors placed on engine 1 and the control laws implemented in the memory of the control unit 20.

The gaseous mixture resulting from the combustion process is discharged from the engine 1 through the exhaust system 3. The exhaust gases go through the turbine 10 and provide, by expanding therein, the mechanical energy necessary for the compression of the mixture going through the compressor 6.

After expansion in the turbine 10, the exhaust gas passes through a post-treatment device 11, made up of a catalyst, which catalyzes the chemical reactions of oxidation and reduction of the pollutants found in the exhaust gases, these pollutants resulting in particular from incomplete combustion. The post-treatment device 11 also comprises a particulate filter, holding back the particles contained in the exhaust gas.

Most of the exhaust is then released to the atmosphere. Part of the exhaust gas is recycled to the intake circuit 2 of the engine 1, by the recirculation circuit 4 which is part of the recirculation system 30.

The exhaust gas recirculation system is made up of:
a device 20 for estimating the recirculated exhaust gas flow rate as described previously,
an intake circuit 2 arranged to supply combustion gases to a heat engine 1,
a recirculation valve 5 arranged to recirculate exhaust gas from the engine 1 to the intake circuit 2.

The recirculated exhaust gas flow estimation device 20 is an electronic control unit arranged to control the opening of the recirculation valve 5 to control the flow of recirculated exhaust gas.

The electronic control unit 20 acquires signals from the various sensors fitted to the engine 1, and controls all the actuators of the engine. In particular, the electronic control unit manages the opening of the recirculation valve 5.

In the example of FIG. 1, the recirculation system 30 is made up of a compressor for forced induction 6 arranged to increase the pressure of the combustion gas flowing through the intake circuit 2, the exhaust gases being recirculated upstream from the compressor 6. This configuration, well known to those skilled in the art, is called "low pressure". The recirculated exhaust gas entering at point 22, located downstream from the turbine 10 and the pollution control device 11, and recirculated at point 21 of the intake circuit 2, upstream from the compressor 6.

The recirculation system 30 is made up of a heat exchanger 13 arranged to cool the recirculated exhaust gases before they pass through the recirculation valve 5.

The recirculation valve 5 makes it possible to regulate the flow rate of recirculated gases in the recirculation circuit 4. The valve 5 includes a movable shutter 18 making it possible to modify the section where the gases circulate. A sensor (not shown) allows the control unit 20 to determine the position of the shutter.

In the example shown, the movable shutter 18 of the valve 5 is a rotary flap and the measured position of the movable shutter 18 is an angular position.

According to another embodiment (not shown), the movable shutter of the valve 5 is a rotary plug and the measured position of the movable shutter is an angular position.

According to another embodiment (also not shown), the movable shutter of the valve 5 is a valve mobile in translation and the measured position of the movable shutter is a linear position.

This type of mechanism is well suited for the high temperatures and pressures that may be encountered in certain applications, such as those where the valve is mounted upstream from the turbine of the centrifugal forced induction device.

Figure 2:
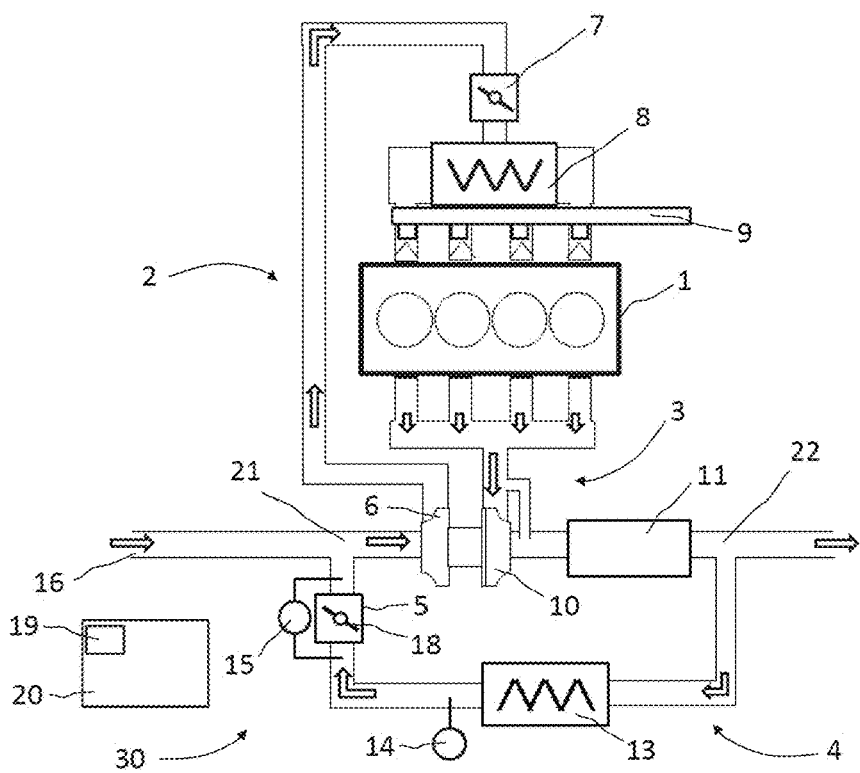
FIG. 2 represents a variant of the recirculation system of the preceding figure.
Figure 3:
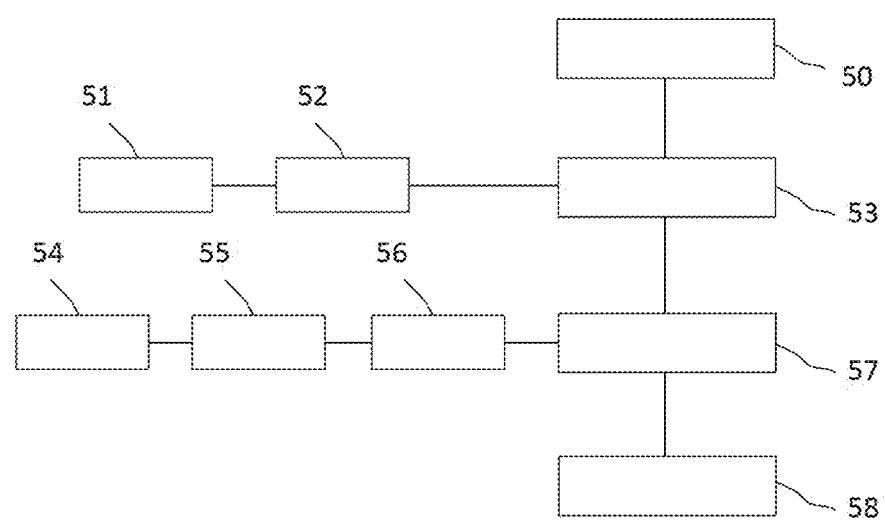
FIG. 3 is a block diagram illustrating the various steps of the method implemented by the device of FIGS. 1 and 2.

FIG. 2 represents a block diagram illustrating the various steps of the method that is the subject of the invention.

The method aims at calculating the flow of recirculated exhaust gas.

This method of estimating an exhaust gas flow recirculated through a recirculation valve 5 connecting an exhaust circuit 3 and an intake circuit 2 of a heat engine 1 includes the steps to:

Determine a difference between the pressure upstream and the pressure downstream from the valve, (step 50)

Determine the density $\rho_{EGR}$ of the recirculated exhaust gas passing through the valve (step 53)

Determine an effective corrected surface $S_{eff\_cor}$ of the valve, (step 57)

Estimate the recirculated exhaust gas flow $Q_{EGR}$ from these three parameters. (step 58)

Specifically, the recirculated exhaust gas flow $Q_{EGR}$ rate is proportional to the square root of the pressure difference, to the corrected effective section of the valve and the square root of the density, according to the equation:

$$Q_{EGR} = S_{eff\_cor} \sqrt{2 \cdot \rho_{EGR} \cdot \Delta P}$$

This equation, which is fundamental to the mechanics of incompressible fluids, makes it possible to calculate the flow of recirculated exhaust gas. This formula is much simpler than the specific formula for compressible flows, used previously in particular in document FR3011073.

In addition, the determination of the flow of recirculated gas only requires knowing the difference between the pressure upstream and the pressure downstream from the valve. It is not necessary to know the absolute pressures upstream and downstream from the valve. It is therefore not necessary to have two separate pressure sensors, which reduces the cost of the recirculation system.

The pressure difference is determined by a sensor 15 arranged to measure the difference between the pressure upstream and the pressure downstream from the recirculation valve 5.

A differential pressure sensor directly measures the pressure difference between the upstream side and the downstream side of the recirculation valve. In the example shown in FIG. 1, the sensor is connected to the recirculation circuit by two hoses connected to the recirculation circuit on either side of the valve.

According to a variant (not shown), the connections of the differential pressure sensor are arranged directly on the valve, with one connection located upstream from the movable shutter and the other connection located downstream from the movable shutter.

According to an embodiment (not shown), the pressure difference is determined by a sensor 15 measuring the absolute pressure upstream from the valve 5 and by an estimation of the pressure downstream from the valve 5.

The absolute pressure downstream from the valve 5 is determined from the atmospheric pressure, the latter being determined elsewhere. By subtracting the value of the pressure downstream from the valve 5 from the value of the pressure measured upstream from the valve 5, the pressure difference is obtained on either side of the valve 5. It is thus possible to use a sensor that is less sophisticated, and cheaper than the differential pressure sensor of the example shown. The pressure downstream from the valve 5 is equal to the atmospheric pressure minus the pressure drop of the circuit portion situated between the inlet 16 of the air circuit 2 and point 21 where the recirculation circuit 4 is connected to the circuit 2. This pressure drop is proportional to the oxidizing air flowing in the circuit 2. According to an exemplary embodiment, the pressure drop is modeled according to the engine rotation speed and an engine torque setpoint. In another example, not shown, the pressure drop is modeled according to the rotational speed of the engine and the pressure measured in the intake manifold. According to yet another example (not shown), the pressure drop is modeled according to the rotational speed of the engine and the air flow rate measured by a flowmeter placed on the intake circuit 2.

The value of the atmospheric pressure is determined elsewhere and its mode of determination will be detailed later.

The calculation of the density of the recirculated exhaust gas includes the steps to:

Determine a pressure P downstream from the valve 5, (step 51)

Determine a temperature $T_{egr}$ representative of the temperature of the gases flowing in the valve 5, (step 52)

Determine the density $\rho_{EGR}$ of the gases passing through the valve 5 from these two parameters. (step 53)

The density of the gases passing through the valve is thus calculated in real time.

For this purpose, the temperature $T_{egr}$ is determined by a sensor 14 measuring the temperature of the gases passing through the recirculation circuit 4.

In the example of FIGS. 1 and 2, the temperature sensor 14 is located in the recirculation circuit 4, upstream from the valve 5. The temperature sensor 14 is located downstream from the heat exchanger 13.

According to embodiments not shown, the temperature sensor 14 can be implanted in the recirculation circuit 4 downstream from the valve 5, or on the valve 5 itself.

The pressure P downstream from the valve 5 is determined from a value of an estimated atmospheric pressure.

In fact, the pressure downstream from the valve 5 is determined by subtracting the value of the pressure drop of the portion of the circuit situated between the inlet 16 of the air circuit and the point 21 where the recirculation circuit is connected to the air circuit from the value of the atmospheric pressure. The atmospheric pressure is determined elsewhere. The pressure drop is determined as described above. It is therefore not necessary to have an absolute pressure sensor downstream from the valve, which limits the cost of the recirculation system.

More specifically, the density $\rho_{EGR}$ is proportional to the pressure P downstream from the valve 5 and inversely proportional to the estimated temperature $T_{egr}$ according to the equation:

$$\rho_{EGR} = \rho_0 * \frac{T_0}{T_{egr}} * \frac{P}{P_0},$$

where $P_0$ and $T_0$ are the normal pressure and temperature conditions of the gas, and $\rho_0$ the density of the gas under normal pressure and temperature conditions.

The temperature is expressed in Kelvin.

The density of the recirculated exhaust gases is modeled using the ideal gas equation, which is valid given the pressure and temperature of the gases: from 0 to 2 bar and up to 900° C.

The calculation of the effective surface $S_{eff}$ of the valve comprises the following steps to:

Measure a position of a movable shutter 18 of the valve 5, the movable shutter 18 being arranged to control the flow of gas passing through the valve 5 by displacement between a minimum flow position and a maximum flow position, (step 54)

Determine the effective surface $S_{eff}$ of the valve 5 from the measured position of the shutter 18. (step 55)

The relation between the position of the shutter and the corresponding effective surface is stored in the electronic control unit 20.

The effective surface determined in the previous step is only a geometric factor signaling the opening of the valve, but not taking into account the nature of the flow. Because of the turbulence and acoustic effects that may occur under certain operating conditions, a corrective factor is incorporated into the flow calculation to improve accuracy.

For this, the method includes steps to:

Determine a correction factor $F_c$ of the effective surface $S_{eff}$ of the valve 5, the correction factor depending on the difference between the pressures measured upstream and the downstream from the valve 5, (step 56)

Determine the effective corrected surface $S_{eff\_cor}$ of the valve, according to the relation: $S_{eff\_cor} = S_{eff} * F_c$. (step 57)

The corrective factor makes it possible to take into account, at least in part, the disturbances in gas flow due to the obstacle created by the movable shutter 18.

The accuracy of the flow modeling is improved by the introduction of the corrective factor of the effective area of the valve.

The corrective factor also depends on the position of the moving shutter 18.

The accuracy of modeling can thus be improved.

As with before, the value of the corrective factor is stored in the control unit 20.

The method of determining the atmospheric pressure will now be detailed.

In the example described, the electronic control unit 20 includes an internal pressure sensor. The inside of the electronic control unit 20 is at atmospheric pressure, the value of the atmospheric pressure is thus obtained directly.

According to an embodiment (not shown), the atmospheric pressure is estimated from the measurement of the pressure in the intake manifold. Under certain operating conditions of the engine, the pressure in the distributor is substantially equal to atmospheric pressure. The value of atmospheric pressure can then be determined. The conditions for determining the value of atmospheric pressure are, for example, the starting phase of the engine and cases in which the throttle body 7 is sufficiently open while the compressor for forced induction 6 is inactive. The pressure in the intake manifold is then equal to the atmospheric pressure minus the pressure drop of the circuit between the inlet 16 and the inlet distributor. This pressure drop is proportional to the flow of combustion air enters the circuit 2. This coefficient of proportionality is different from that used for the modeling of the pressure drop between the input 16 of the circuit 2 and the point 21, since the gas path is longer.

This value will be used to determine the prevailing pressure downstream from the recirculation valve 5.

Preferably, the intake circuit 2 is arranged such that the pressure downstream from the recirculation valve 5 is substantially equal to the atmospheric pressure minus the pressure drop of the intake circuit portion located upstream from the recirculation valve.

This is obtained when a metering valve 17, placed upstream from the point where the recirculation circuit meets the intake circuit, is nearly fully open. Thus, the pressure drop created by the metering valve 17 is low and it is possible to equate the pressure downstream from the recirculation valve 5 to atmospheric pressure minus the pressure drop of the intake circuit portion located upstream of point 21.

In the example of FIG. 1, this means that the metering valve 17, placed upstream from point 21 where the recirculation circuit 4 meets the intake circuit 3, nearly fully open. Thus, the pressure drop generated by the metering valve 17 is low and it is possible to equate the pressure downstream from the recirculation valve 5 to atmospheric pressure minus the pressure drop of the portion of the intake circuit located upstream from the recirculation valve. This corresponds to the case where it is not necessary to reduce the pressure downstream from the valve 5 to reach the recirculated gas flow setpoint.

The difference between the pressures upstream and downstream from the valve is sufficiently small to allow the flow equation of incompressible fluids to be used, without significantly degrading the accuracy of the estimation. The cost of the sensors used is reduced, as well as the necessary computing power.

According to the embodiment of FIG. 2, the intake circuit 2 lacks an air flow regulating member in a circuit portion located upstream of the point 21 of exhaust gas recirculation. When the recirculated gas flow is sufficient over the entire operating range of the engine without creating a vacuum downstream from the valve, the flow control device located upstream from the recirculation point of the gas is not necessary. The cost of this device is thus eliminated.

In the example shown in FIG. 1, the recirculation system 30 also includes a counterpressure valve 12 arranged to increase the pressure of the gases upstream from the recirculation valve 5. The counterpressure valve 12 is situated in the recirculation circuit 3 downstream from point 22 where the exhaust gases enter the recirculation circuit. The counterpressure valve 12 comprises a flap that is mobile in rotation, and increases the backpressure in the upstream portion of the circuit, opposing the flow of gas. The flow of recirculated gas is thus increased, since the difference between the pressures upstream and the downstream from the valve is increased. This solution can be implemented when the natural counterpressure present in the exhaust circuit is insufficient for creating the recirculation flow rate.

The backpressure valve 12 includes a device 11 for cleaning up exhaust gases.

The point 22 where the recirculated exhaust gases enter the recirculation circuit 4 is also set downstream from the exhaust gas depollution device.

The pollution control device includes an oxidation and reduction catalyst. It may also include a particulate filter. The recirculated exhaust gases are thus free of most of the solid and gaseous pollutants from the exhaust gas, which in particular reduces clogging of the recirculation circuit, and prevents abrasive particles from passing through the compressor for forced induction.

The recirculation system 30 in FIG. 1 has both an intake metering valve 17 and an exhaust counterpressure pressure valve 12. It is thus possible to increase the pressure upstream from the valve 5 and reduce the pressure downstream from the valve 5 independently. This configuration therefore makes it possible to achieve very high recirculated gas flow rates whatever the operating conditions of the engine.

On the other hand, the recirculation system 30 of FIG. 2 does not have a metering valve 17 or a backpressure valve 12. Its cost is limited but it is not possible to increase the pressure across the valve in order to increase the flow of recirculated gas.

According to another embodiment also not shown, the recirculation system 30 lacks a metering valve at the inlet and has a backpressure valve at the exhaust.

These last two configurations are simpler to implement and more economical than the one in FIG. 1. They represent a compromise between the two configurations represented.

The method described above is implemented by a device 20 used for estimating the flow of exhaust gas recirculated through a recirculation valve 5, comprising a data processing unit 19, arranged to:

Determine a difference ΔP between the upstream and downstream pressure of the valve 5,
Determine a density $\rho_{EGR}$ of the recirculated exhaust gas passing through the valve 5,
Determine an effective corrected surface $S_{eff\_cor}$ of the valve 5,
Estimate the recirculated exhaust gas flow $Q_{EGR}$ from these three parameters.

The recirculated exhaust gas flow rate $Q_{EGR}$ is proportional to the square root of the pressure difference, valve cross-section, and square root of the density, according to the equation:

$$Q_{EGR} = S_{eff\_cor}\sqrt{2 \cdot \rho_{EGR} \cdot \Delta P}.$$

The invention claimed is:

1. A method implemented by an electronic control unit for estimating a flow of exhaust gas recirculated through a recirculation valve (5) that connects an exhaust circuit (3) and an intake circuit (2) of a heat engine (1) for controlling said recirculation valve (5), the method comprising:
determining, by use of a pressure measurement device upstream of the valve, a pressure difference ΔP between a pressure upstream and a pressure downstream from the valve;
determining a density $\rho_{EGR}$ of the recirculated exhaust gas passing through the valve;
determining an effective corrected surface $S_{eff\_cor}$ of the valve; and
using said pressure difference ΔP, said density $\rho_{EGR}$, and said effective corrected surface $S_{eff\_cor}$ of the valve to determine an estimated recirculated exhaust gas flow $Q_{EGR}$, and
communicating with the valve to control an opening of the valve,
wherein:
a pressure P downstream of the valve (5) is determined, a temperature $T_{egr}$ of the gases flowing in the valve (5) is determined, and the density $\rho_{EGR}$ of the exhaust gas passing through the valve (5) is determined from the pressure P downstream of the valve (5) and the temperature $T_{eg}$, of the gases flowing in the valve (5); and
the pressure P downstream from the valve is determined from a value of an atmospheric pressure and a value of a pressure drop, the value of the pressure drop being determined according to an engine rotation speed and an engine torque setpoint.

2. The method according to claim 1, wherein the flow $Q_{EGR}$ of recirculated exhaust gas is proportional to the square root of the pressure difference ΔP, the effective corrected surface $S_{eff\_cor}$ of the valve, and the square root of the density $\rho_{EGR}$, according to the equation:

$$Q_{EGR} = S_{eff\_cor}\sqrt{2 \cdot \rho_{EGR} \cdot \Delta P}.$$

3. The method to claim 2, further comprising:
measuring a position of a movable shutter (18) of the valve (5), the movable shutter (18) configured to control the flow of gas passing through the valve (5) by switching between a minimum flow position and a maximum flow position; and
determining an effective surface area $S_{eff}$ of the valve (5) from the measured position of the shutter (18).

4. The method to claim 1, wherein the density $\rho_{EGR}$ is proportional to the pressure P downstream of the valve (5) and inversely proportional to the estimated temperature $T_{egr}$ according to the equation:

$$\rho_{EGR} = \rho_0 * \frac{T_0}{T_{egr}} * \frac{P}{P_0},$$

where $P_0$, and $T_0$, and $\rho_0$ are pressure, temperature, and density of gases under normal pressure and temperature conditions.

5. The method to claim 4, further comprising:
measuring a position of a movable shutter (18) of the valve (5), the movable shutter (18) configured to control the flow of gas passing through the valve (5) by switching between a minimum flow position and a maximum flow position; and
determining an effective surface area $S_{eff}$ of the valve (5) from the measured position of the shutter (18).

6. The method to claim 1, further comprising:
measuring a position of a movable shutter (18) of the valve (5), the movable shutter (18) configured to control the flow of gas passing through the valve (5) by switching between a minimum flow position and a maximum flow position; and
determining an effective surface area $S_{eff}$ of the valve (5) from the measured position of the shutter (18).

7. The method to claim 6, further comprising:
determining a correction factor $F_c$ for the effective surface area $S_{eff}$ of the valve (5), the correction factor depending on the pressure difference ΔP determined between the pressure upstream and the pressure downstream from the valve (5),
determining the effective corrected surface $S_{eff\_cor}$ of the valve, according to the relation:

$$S_{eff\_cor} = S_{eff} * F_c.$$

8. The method to claim 1, wherein the pressure P downstream from the valve (5) is determined from a value of an estimated atmospheric pressure.

9. The method to claim 8, wherein the density $\rho_{EGR}$ is proportional to the pressure P downstream of the valve (5) and inversely proportional to the estimated temperature $T_{egr}$ according to the equation:

$$\rho_{EGR} = \rho_0 * \frac{T_0}{T_{egr}} * \frac{P}{P_0},$$

where $P_0$, and $T_0$, and $\rho_0$ are pressure, temperature, and density of gases under normal pressure and temperature conditions.

10. The method to claim 8, further comprising:

measuring a position of a movable shutter (18) of the valve (5), the movable shutter (18) configured to control the flow of gas passing through the valve (5) by switching between a minimum flow position and a maximum flow position; and determining an effective surface area $S_{\textit{eff}}$ of the valve (5) from the measured position of the shutter (18).

11. A device for controlling a flow of exhaust gas recirculated through a recirculation valve (5) that connects an exhaust circuit (3) and an intake circuit (2) of a heat engine (1), the estimation device comprising:

a data processing unit (19) configured to:

communicate with and receive pressure information from a pressure measurement device upstream of the valve;

determine, from the information received from the pressure measurement device, a pressure difference $\Delta P$ between a pressure upstream and a pressure downstream of the valve (5);

determine a density $\rho_{EGR}$ of the recirculated exhaust gas passing through the valve (5);

determine a corrected effective area $S_{\textit{eff\_cor}}$ of the valve (5);

determine an estimated recirculated exhaust gas flow $Q_{EGR}$ from said pressure difference $\Delta P$, said density $\rho_{EGR}$, and said effective corrected surface area $S_{\textit{eff\_cor}}$ of the valve; and communicate with the valve to control an opening of the valve, wherein:

a pressure P downstream of the valve (5) is determined, a temperature $T_{egr}$ of the gases flowing in the valve (5) is determined, and the density $\rho_{EGR}$ of the exhaust gas passing through the valve (5) is determined from the pressure P downstream of the valve (5) and the temperature $T_{egr}$ of the gases flowing in the valve (5); and the pressure P downstream from the valve is determined from a value of an atmospheric pressure and a value of a pressure drop, the value of the pressure drop being modeled according to an engine rotation speed and an engine torque setpoint.

12. The device, according to claim 11, wherein the recirculated exhaust gas flow $Q_{EGR}$ rate the recirculated exhaust gas is proportional to the square root of the pressure difference $\Delta P$, the effective corrected surface area $S_{\textit{eff\_cor}}$ of the valve, and the square root of the density $\rho_{EGR}$, according to the equation:

$$Q_{EGR} = S_{\textit{eff\_cor}} \sqrt{2 \cdot \rho_{EGR} \cdot \Delta P}.$$

13. An exhaust gas recirculation system (30), comprising:

the device to estimate (20) the flow rate of recirculated exhaust gas recirculated through a recirculation valve according to claim 12;

an intake circuit (2) arranged to supply combustion gases to a heat engine (1); and a recirculation valve (5), arranged to recirculate exhaust from the engine (1) to the intake circuit (2).

14. An exhaust gas recirculation system (30), comprising:

the device to estimate (20) the flow rate of the exhaust gas recirculated through a recirculation valve according to claim 11;

an intake circuit (2), arranged to supply combustion gases to a heat engine (1); and a recirculation valve (5), arranged to recirculate exhaust from the engine (1) to the intake circuit (2).

15. The recirculation system (30) according to claim 14, further comprising a compressor for forced induction (6) arranged to increase a pressure of the combustion gas flowing in the intake circuit (2), wherein the exhaust gas is recirculated upstream of the compressor for forced induction (6).

* * * * *